United States Patent [19]

Karsh

[11] 4,063,292
[45] Dec. 13, 1977

[54] INTEGRAL RETAINED FILE PROTECT MEANS

[75] Inventor: Irving Karsh, Los Angeles, Calif.

[73] Assignee: Bell & Howell Company, Chicago, Ill.

[21] Appl. No.: 712,871

[22] Filed: Aug. 9, 1976

[51] Int. Cl.² .............................................. G11B 15/04
[52] U.S. Cl. ..................................................... 360/60
[58] Field of Search .................................. 360/60, 134

[56] References Cited

U.S. PATENT DOCUMENTS

| 3,199,091 | 8/1965 | Barkhuff | 360/60 |
| 3,199,093 | 8/1965 | Cheney | 360/60 |
| 3,772,662 | 11/1973 | Blair | 360/60 |
| 3,777,074 | 12/1973 | Olmsted | 360/60 |

FOREIGN PATENT DOCUMENTS

| 385,312 | 3/1971 | U.S.S.R. | 360/60 |

*Primary Examiner*—Jay P. Lucas
*Attorney, Agent, or Firm*—Richard L. Myers

[57] ABSTRACT

A tape reel adapted for use with a tape recorder/reproducer having control means operable to inhibit destruction of information on the tape by recording over previous information, includes a flange defining a tape cavity of the reel and a retaining wall extending axially of the flange. A lockout ring having portions defining an L-shaped cross section is configured to be removably retained by the retaining wall in a first position and a second position. A plunger assembly associated with the recorder/reproducer detects the position of the lockout ring to inhibit the record/erase electronics when the ring is in the first position. A detent assembly maintains the plunger in spaced relationship with the lockout ring in both the first and second positions to reduce the noise associated with the recording and the reproducing of the tape.

10 Claims, 7 Drawing Figures

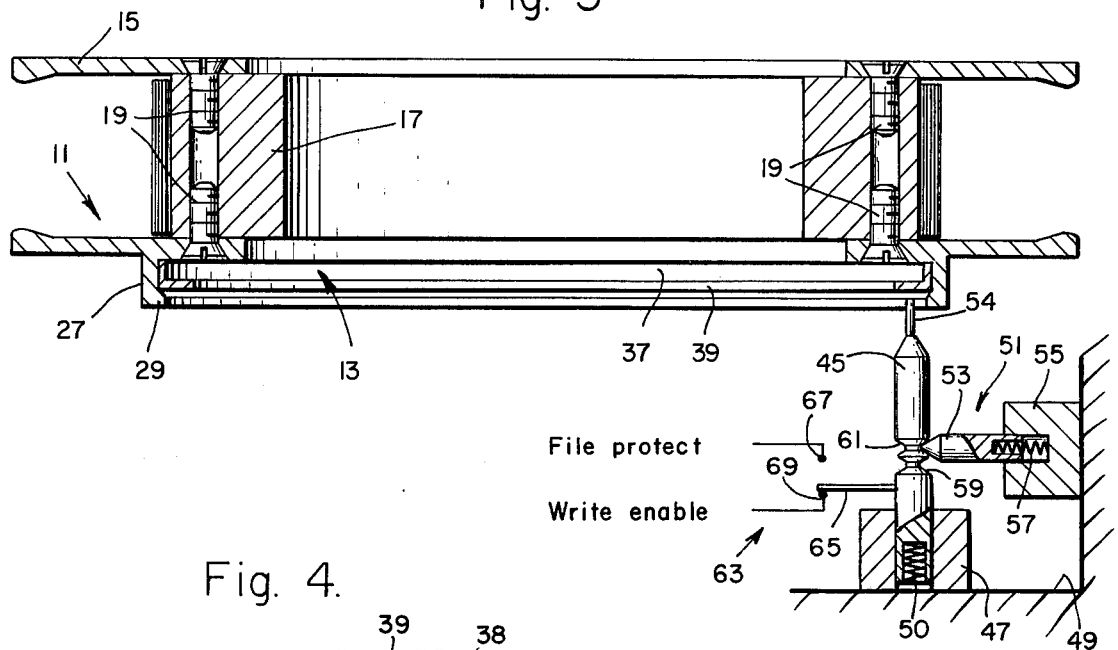
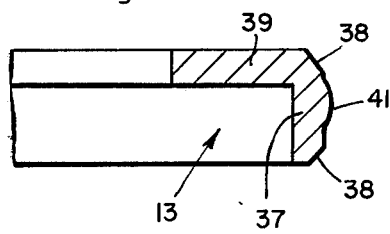
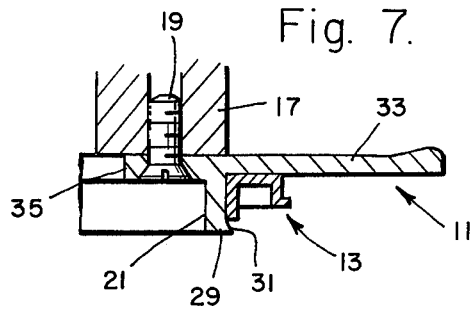
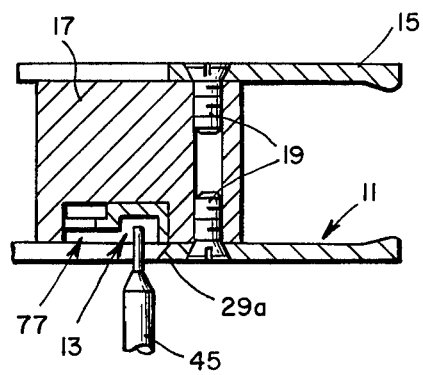

INTEGRAL RETAINED FILE PROTECT MEANS

BACKGROUND OF THE INVENTION

1. Field of the Invention

This invention relates generally to recording and reproducing apparatus and more specifically to reels for storing magnetic tape or film.

2. Discussion of the Prior Art

Reels are commonly used for storing tape or film such as the magnetic recording tape typically used with audio and visual recording and reproducing apparatus. These reels usually have a cylindrical core and a pair of flanges which extend radially from the ends of the core. The tape is wound on the peripheral surface of the core between the flanges.

It has been desirable to provide some means for protecting the recorded information on the tapes so that the information is not accidentally erased by the recording electronics associated with the reproducing apparatus. Erasure of the information on the tape can quite easily occur if the reproducing apparatus is placed in the record mode. Since the entire tape may be rendered useless even if only a portion of the valuable information is erased, it can be of significant importance to inhibit this accidental erasure of the valuable information.

In the past, a lockout ring has been provided for retention on the outer surface of one of the reel flanges. A sensor, riding on the ring, has sensed the presence of the ring and activated associated electronics to inhibit the record mode of the reproducing apparatus. This method and apparatus has been undesirable for several reasons. For example, the sensor dragging along the lockout ring has created mechanical flutter which has ultimately produced undesirable noise in the reproduction of the tape.

Another deficiency of this lockout system of the prior art has been associated with the ring itself. The configuration of this ring has permitted its retention on the associated reel in but a single position. The sensor and associated electronics has merely sensed the presence or absence of the ring. When a user has decided to erase and rewind the tape, this lockout ring has had to be removed from the reel and set aside. There has been no means for retaining the ring on the reel while at the same time enabling the tape to be rerecorded. As a consequence, the lockout ring has had to be stored at some location separated from the reel. Not only has this necessitated that care be taken in setting the lockout ring aside, but it has also commonly resulted in loss of the ring.

SUMMARY OF THE INVENTION

The present invention overcomes the deficiencies of these lockout systems of the prior art. The lockout ring of the present invention can be retained on the reel in two dissimilar positions. The disposition of the lockout ring in the first position can be detected to inhibit the record electronics and thereby protect the information on the tape. Of particular significance, is the fact that the lockout ring can be retained in a second position on the reel in which position, the record electronics is not inhibited so that the associated tape can be erased and rerecorded.

It is particularly advantageous that the lockout ring is retained on the reel in both of these modes of operation. The ring need not be separately stored and accounted for when it is desirable to rerecord the tape. There is substantially no danger that the lockout ring will be lost since it can always be retained with the associated reel.

The present invention also provides a plunger assembly which senses the presence of the ring in either the first or the second of its positions. This plunger assembly is particularly desirable since it does not ride directly on the lockout ring or any other portion of the reel. Rather, it is spaced slightly from the lockout ring so there is no mechanical flutter or drag on the reel.

While the specification concludes with claims particularly pointing out and distinctly claiming the subject matter which is regarded as the invention, it is believed that the invention, and the features and advantages thereof will be better understood from the following description taken in connection with the accompanying drawings.

DESCRIPTION OF THE DRAWINGS

FIG. 3 is an axial cross sectional view of one embodiment of the reel of the present invention illustrating the lockout ring retained in the other of its two positions on the reel;

FIG. 4 is a partial axial cross sectional view of an additional embodiment of the lockout ring of the present invention;

FIG. 5 is a partial axial cross sectional view of a further embodiment of the reel and associated lockout ring of the present invention;

FIG. 6 is a partial axial cross sectional view of an additional embodiment of the reel and associated lockout ring of the present invention; and FIG. 7 is a partial axial cross sectional view of still a further embodiment of the reel and associated lockout ring of the present invention.

DESCRIPTION OF PREFERRED EMBODIMENTS

Figure 1:
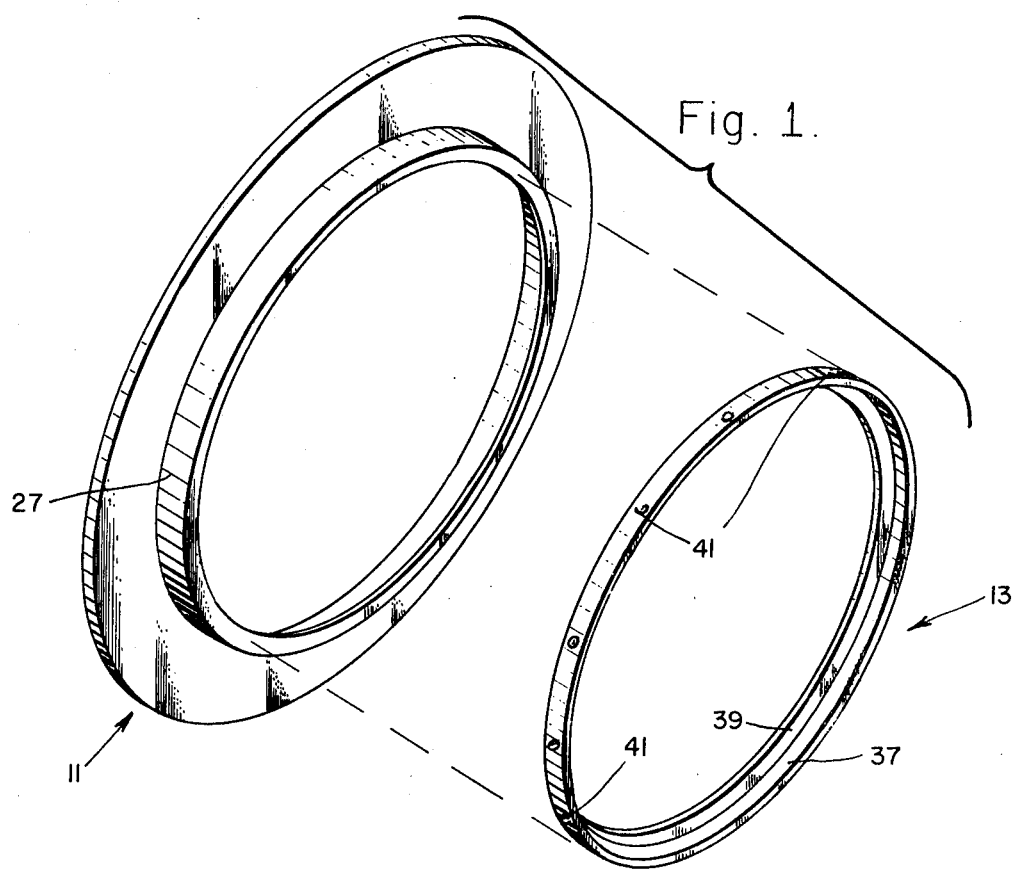
FIG. 1 is an assembly view of a tape reel flange and an associated lockout ring in one embodiment of one form of the present invention.

A tape reel flange and lockout ring associated with one form of the present invention are illustrated in FIG. 1 and designated generally by the reference numerals 11 and 13, respectively. In this assembly view, the ring 13 is illustrated displaced from its normally retained position on the flange 11.

Figure 2:
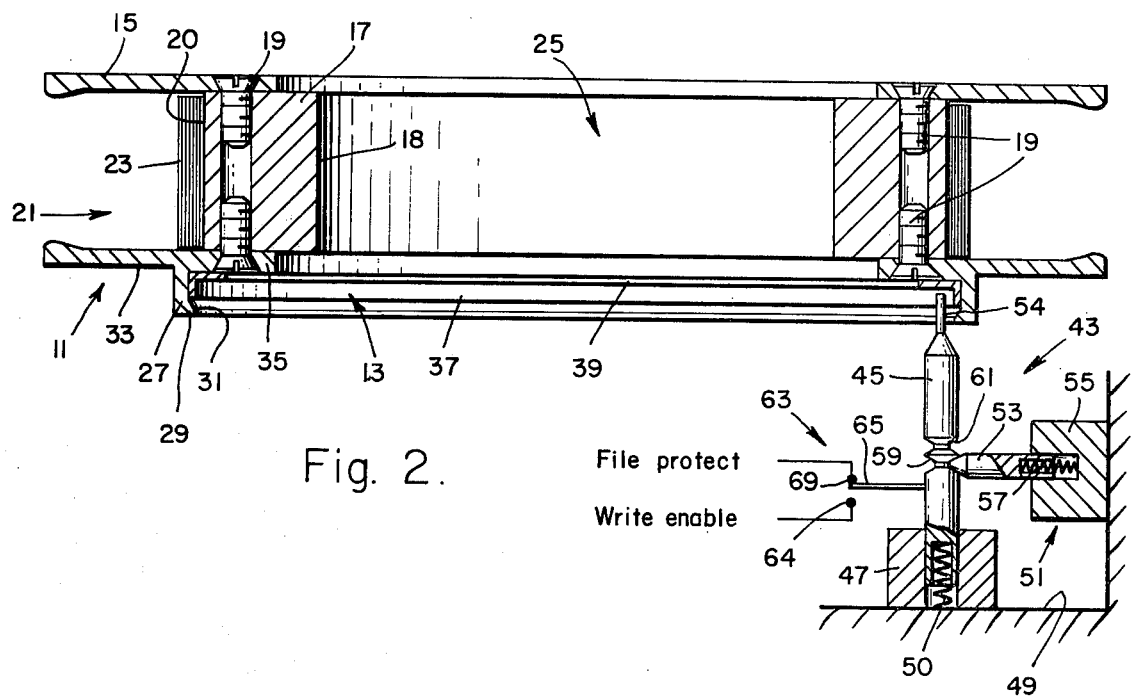
FIG. 2 is an axial cross sectional view of one embodiment of the reel of the invention illustrating the lockout ring retained in one of its two positions on the reel.

The flange 11 and ring 13 of this embodiment of the invention are illustrated in greater detail in the axial cross sectional views of FIGS. 2 and 3. In these views it can been seen that the flange 11 is disposed in substantially parallel relationship with another flange 15 on opposite sides of a core 17. The core 17 has a hollow cylindrical configuration with surfaces 18 and 20 defining an inner circumference and an outer circumference respectively. The flanges 11 and 15, which extend radially beyond the surface 20 of the core 17, are fixed to the core 17 by a plurality of screws 19. With this configuration the flanges 11 and 15 define with the core 17 a radially accessible cavity 21 suitable for storing a film or magnetic tape 23. The core 17 may be formed from a light weight metal such as Aluminum while the flanges 11 and 15 will typically be constructed of plastic.

As thus far described, the flanges 11, 15 and core 17 form a rather conventional reel for storing the tape 23 which is suitable for use with a tape recorder (not shown). The surface 18 defines an axial bore 25 which can be suitably shaped to register with a rotatable hub on the recorder. A retaining cap (not shown) is typically used to retain the reel against the hub of the recorder during use.

The reel of the present invention is provided with a retaining wall 27 which extends from the outer surface of the flange 11. In a preferred embodiment, the retaining wall 27 is integral with the flange 11 and has a cylindrical configuration in coaxial alignment with the core 25. In use, the reel is positioned with the flange 11 toward the recorder so that the retaining wall 27 extends into the recorder beyond the plane of the flange 11. A retaining lip 29 can be provided to extend radially inwardly from the outermost end of the retaining wall 27. This lip 29 provides the wall 27 with a reduced diameter at the outermost end of the wall 27. The lip 29 in the preferred embodiment has a chamfered surface 31 which extends radially outwardly with progressive positions from the lip 29 to the flange 11.

The flange 11 in the illustrated embodiment has an outer flange portion 33 which extends outwardly of the retaining wall 27 and an inner flange portion 35 which extends inwardly of the retaining wall 27. In the preferred embodiment the second flange portion 35 is thicker than the first flange portion 33; it is through this second flange portion 35 that the screws 19 peripherally extend into the core 17.

The lockout ring 13 can have many different configurations. It is particularly advantageous however that the ring 13 be shaped for retention by the retaining wall 27 in at least two different positions. One such configuration is illustrated in FIGS. 1, 2, 3 and 4. In this embodiment, the ring 13 is provided with a cylindrical side wall 37 and a flange 39 which extends radially inwardly from one of the ends of the side wall 37. In a preferred form the outer diameter of the side wall 37 is less than the inner diameter of the lip 29. With this dimensional relationship the ring 13 can be snap fit onto the flange 11 with the side wall 37 of the ring 13 in substantially contiguous relationship with the inner surface of the retaining wall 37.

A plurality of bumps or notches 41 can be provided on the outer surface of the side wall 37 to enhance this desirable snap fit relationship. These notches 41 are best illustrated in the perspective view of FIG. 1 and the cross sectional view of FIG. 4.

As further illustrated in FIG. 4, the side wall 37 of the ring 13 can be provided with chamfers 38 at either end of the side wall 37. These chamfers 38 facilitate the ease with which the ring 13 can be inserted into and removed from the retaining wall 37.

This embodiment of the ring 13 which has an L-shaped cross section, is particularly desirable since the ring 13 can be snap fit onto the flange 11 in two different positions. In a first position, illustrated in FIG. 2, the flange 39 of the ring 13 is disposed against the flange portion 35 of the flange 11. In a second position, illustrated in FIG. 3, the flange 39 of the ring 13 is disposed in spaced relationship with the flange portion 35.

This difference in the disposition of the flange 39 can be detected by a file protect mechanism designated generally by the reference numeral 43 in FIGS. 2 and 3. This file protect mechanism 43 includes a plunger 45 which can be slideably supported in a spring housing 47 which is fixed to the supporting structure of the recorder. A spring 50 can be disposed in the housing 47 to bias the plunger 45 in the direction of the ring 13. A reduced diameter of the plunger 45 forms a finger 54 in closest proximity to the ring 13.

A detent mechanism 51 can be provided to hold the plunger 45 in one of two positions. This detent mechanism 51 can include a detent 53 which is slideably supported in a housing 55 and biased by a spring 57 in the direction of the plunger 45. The detent 53 is configured to register with a pair of radial notches 59 and 61 in the plunger 45.

It is of particular significance that the position of the plunger 45 follows the position of the ring 13 in the retaining wall 27. Thus when the ring 13 is in the first position, as illustrated in FIG. 2 with the flange 39 against the flange portion 35, the plunger 45 is in a first position with the detent 53 engaging the notch 59. When the ring 13 is in the second position, as illustrated in FIG. 3 with the flange 39 spaced from the flange portion 35, the plunger 45 is in a second position wherein the detent 53 engages the notch 61. In this manner, the plunger 45 provides a follower for determining the position of the ring 13 with respect to the retaining wall 27.

A switch 63 associated with the plunger 45 can provide either of a pair of electrical signals depending upon the position of the plunger 45. The switch 63 can be provided with a switch arm 65 which is substantially fixed to the plunger 45. A pair of switch contacts 67 and 69 are individually engaged by the arm 65 when the detent 53 engages the notches 59, 61 respectively.

It can now be seen that the file protect mechanism 43 provides means for sensing the position of the ring 13 and developing a first signal on the contact 67 when the ring 13 is in the first position, or a second signal on the contact 69 when the ring is in the second position. This first electrical signal can be used in a conventional manner for activating file protect electronics (not shown) which inhibits the record mode of the recorder. In this manner, the information recorded on the tape 23 can be protected against erasure and thereby preserved. This advantageous means for protecting the tape information is achieved by initially positioning the ring 13 in its first position with respect to the retaining wall 27.

If it is no longer desirable to protect the information on the tape 23, the ring 13 can be disposed in its second position as illustrated in FIG. 3. This can ultimately produce an electrical signal on the switch contact 69 to enable the erasure of old information from the tape 23 and permit the writing of new information onto the tape 23. It can be understood that the electrical signals on the contacts 67 and 69 can be of many types providing for the inhibiting and the enabling of the erased electronics in the recorder. For example, in another embodiment, either of these signals associated with the contacts 67 and 69 may be the absence of a signal.

The file protect mechanism 43 associated with the present invention is particularly desirable for a further reason. It will be noticed that the finger 55 of the plunger 45 need not ride on the ring 13 in either of the first or second positions. If the finger 55 were to ride on the ring 13, it would tend to drag on the ring 13 thereby adding undesirable mechanical noise to the tape transport. This of course would undesirably reduce the signal to noise ratio during the reproduction of the tape 23. Thus the notch 59 can be positioned on the plunger 45 so that the finger 55 is displaced slightly from the flange 39 in the first position as illustrated in FIG. 2. If the ring 13 is then disposed in the second position, the flange 39 will press the plunger downwardly until the detent 53 engages the notch 61. In this second position of the plunger 45, the finger 55 is also displaced slightly from the flange 39 as illustrated in FIG. 3.

A further embodiment of the ring 13 is illustrated in FIG. 5. In this embodiment, a lip support wall 71 extends from the inner circumference of the flange 39 to support a lip 73 on the same side of the flange 39 as the side wall 37. The support wall 71 typically extends coaxially with the side wall 37 so that it has a generally cylindrical configuration. In the preferred embodiment, the lip 73 extends radially inwardly of the wall 71 and defines the inner circumference of the ring 13. This embodiment of the ring 13 is particularly desirable since the lip 73 is defined by a pair of shoulders 75 which are easily engaged, for example by a fingernail, to facilitate removal of the ring 13 from the retaining wall 27. In order that the lip 73 can be engaged with the ring 23 disposed in either of its two positions, it may be desirable that the lip support wall 71 have a height less than that of the side wall 37.

In a further embodiment of the flange 11, the retaining wall 37 is formed with the lip 29 and chamfered surface 31 facing outwardly as illustrated in FIG. 7. In this embodiment, the lockout ring 13 is retained on the flange 11 outwardly of the retaining wall 27. With this configuration, the ring 13 is also capable of being supported in two different positions on the flange 11 in order to obtain the advantages previously discussed. This embodiment may facilitate insertion and removal of the ring 13 depending, for example, on the size of the ring 13.

In a further embodiment of the invention, it may be desirable to retain a substantially planar configuration on the outer surface of the flange 11. In such an embodiment, the core 17 can be provided with a cylindrical channel 77 as illustrated in FIG. 6. The flange 11 can be chamfered on the inner circumference thereof to form a lip 29a which extends slightly over the channel 77. The ring 13 can be embodied in any of the foregoing manners to snap fit over the lip 29a into the channel 77. In this embodiment, the finger 55 of the plunger 45 would extend beyond the plane of the flange 11 into the channel 77 to detect the position of the ring 13 as previously discussed.

It is to be understood that in some tape recorder/reproducers, there is no erase electronics. In such recorders, new information is recorded directly over the old information. The concept of this invention includes the inhibiting of the record electronics in such an apparatus. For this reason, the words "erase electronics", "record electronics" and "erase/record electronics" are used interchangeably and apply to the recording function whether or not it includes an erase function.

It can be seen that any of the foregoing embodiments of the flange 11 and ring 13 can be combined to provide the advantages associated with this invention. By providing a lockout ring which can be retained on the flange 11 in two different positions, a file protect mechanism can be used to detect the position of the ring and either inhibit or enable the erase and record electronics of a recorder. A single position ring need not be set aside and perhaps lost in one of these two alternate modes of operation. By providing a detent mechanism to cooperate with the plunger 45, the finger 55 need not ride on the ring 13 in either of its two positions.

Although the invention has been described with reference to particular embodiments, it would be apparent that the invention may be otherwise embodied so that the scope of the invention should be ascertained only with reference to the following claims.

What is claimed is:

1. A reel adapted to store magnetic tape for use with a magnetic tape recorder/reproducer having record/erase electronics operable to inhibit erasure of information on the tape, the reel having a core, a first flange and a second flange defining a tape cavity for storing the tape, wherein the improvement comprises:
   retaining means having an annular configuration and extending from the first flange onto the side of the first flange opposite the tape cavity;
   lockout means having an annular configuration and being adapted to be removably retained by the retaining means in a first position and in a second position different from the first position;
   a particular annular flange included in the lockout means and having a first relationship with the first flange in the first position and a second relationship with the first flange in a second position; whereby the reel with the lockout means in the first position is adapted to operate the erase electronics of the recorder/ reproducer to inhibit erasure of the information on the tape.

2. The reel recited in claim 1 wherein the retained means includes:
   a retaining wall having an annular configuration and extending generally axially of the core of the reel on the side of the first flange opposite the tape cavity;
   a retaining lip having an annular configuration and disposed radially of the retaining wall at the furthest extension thereof, the lip having a diametral dimension less than that of the retaining wall; and
   a chamfered surface defining a portion of the lip on the side thereof facing the first flange, the chamfered surface extending radially outwardly with progressive positions in the direction of the first flange.

3. The reel set forth in claim 2 wherein the lockout means includes:
   a side wall having an annular configuration and an outer surface extending from a first end of the side wall to a second end of the side wall;
   a particular flange having an annular configuration and extending radially of the side wall at the first end thereof;
   the height of the side wall being not greater than the axial dimension of the retaining wall of the retaining means; and
   the diameter of the outer surface of the side wall being not greater than the diameter of the retaining wall of the retaining means.

4. The reel set forth in claim 3 wherein:
   the outer surface of the side wall of the lockout means has a first chamfer at the first end of the side wall and a second chamfer at the second end of the side wall;
   the first chamfer extending radially outwardly with progressive positions toward the second end of the side wall; and
   the second chamfer extending radially outwardly with progressive positions toward the first end of the side wall.

5. The reel recited in claim 1 wherein the lockout means includes:

a side wall having an annular configuration and an outer surface extending from a first end of the side wall to a second end of the side wall;

the particular flange having an annular configuration and extending radially of the side wall at the first end thereof;

the outer surface of the side wall of the lockout means having a first chamfer at the first end of the side wall and a second chamfer at the second end of the side wall;

the first chamfer extending radially outwardly with progressive positions toward the second end of the side wall; and the second chamfer extending radially outwardly with progressive positions toward the first end of the side wall.

6. In combination:

a tape reel having a core with a generally cylindrical configuration and being adapted to store on the periphery of the core a magnetic tape having information recorded thereon;

a flange having a generally planar configuration and a fixed relationship with the core, the flange extending radially of the core at one end thereof;

an annular ring having portions defining an L-shaped cross-section;

means formed on the tape reel for removably retaining the ring on the tape reel in a first position of the ring and a second position of the ring different from the first position; and means for detecting the disposition of the ring on the reel in the first position for inhibiting the erasure of the information on the tape, and for detecting the disposition of the ring on the reel in the second position for permitting the erasure of the information on the tape.

7. The combination recited in claim 6 being adapted for use with a magnetic recorder/reproducer, the detecting means including:

a plunger movable relative to the ring on the flange between a first position when the ring is in its first position and a second position when the ring is in its second position;

switch means having first and second contacts and being operable by the plunger for activating the first contact when the plunger is in its first position and for activating the second contact when the plunger is in its second position; and the recorder/reproducer being responsive to the activation of the first contact by the switch means to inhibit the erasure of the information on the recording tape.

8. The combination set forth in claim 7 further comprising detent means movable relative to the plunger to maintain the plunger in one of its first position and its second position.

9. The combination set forth in claim 8 wherein:

the plunger is displaced from the ring when the ring is disposed in its first position and the plunger is disposed in its first position; and the plunger is displaced from the ring when the ring is disposed in its second position and the plunger is disposed in its second position.

10. The combination recited in claim 6 wherein the retaining means includes:

a wall formed on the tape reel and having an annular configuration, the wall extending generally transverse to the plane of the flange;

a lip extending radially inwardly of the wall at the outermost edge of the wall;

the diameter of the ring being greater than the diameter of the lip and less than the diameter of the wall; and the wall being formed of a yieldable material to permit the ring to be snap fit over the lip for retention by the wall end of that.

* * * * *